(12) United States Patent
Maseki et al.

(10) Patent No.: US 9,334,125 B2
(45) Date of Patent: May 10, 2016

(54) CONVEYANCE SYSTEM FOR MACHINING APPARATUS

(71) Applicant: JTEKT CORPORATION, Osaka-shi (JP)

(72) Inventors: Katsuhiro Maseki, Nagoya (JP); Tatsuhiko Inagaki, Ichinomiya (JP); Masanori Ando, Nishio (JP); Takaaki Sugiura, Chita-gun (JP); Kazuhiro Tsujimura, Okazaki (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/729,582

(22) Filed: Jun. 3, 2015

(65) Prior Publication Data

US 2015/0360874 A1 Dec. 17, 2015

(30) Foreign Application Priority Data

Jun. 11, 2014 (JP) .................................. 2014-120301

(51) Int. Cl.
*G06F 7/00* (2006.01)
*B65G 43/00* (2006.01)
*B23Q 7/16* (2006.01)
*B23Q 7/00* (2006.01)
*B23Q 15/22* (2006.01)

(52) U.S. Cl.
CPC ................ *B65G 43/00* (2013.01); *B23Q 7/003* (2013.01); *B23Q 7/16* (2013.01); *B23Q 15/225* (2013.01)

(58) Field of Classification Search
None
See application file for complete search history.

(56) References Cited

U.S. PATENT DOCUMENTS

| 2007/0082824 A1* | 4/2007 | Bell | C09K 8/36 507/128 |
| 2008/0179097 A1* | 7/2008 | Eia | E21B 21/066 175/66 |
| 2013/0324444 A1* | 12/2013 | Lesko | C09K 8/42 507/206 |

FOREIGN PATENT DOCUMENTS

| JP | 62-218393 A | 9/1987 |
| JP | 4-58712 U | 5/1992 |
| JP | 2004-123350 A | 4/2004 |
| JP | 2012-76858 A | 4/2012 |

* cited by examiner

*Primary Examiner* — Yolanda Cumbess
(74) *Attorney, Agent, or Firm* — Oblon, McClelland, Maier & Neustadt, L.L.P

(57) ABSTRACT

A conveyance system is provided which conveys an object to a machining apparatus using a conveying apparatus and which further enables power saving. A controller calculates a first conveyance completion estimated time when conveyance from a first mounting position to machining apparatuses at a reference speed is complete. If a request to load a next object into the machining apparatus is issued by the machining apparatus, the controller decides a first moving speed of a conveying apparatus to be a reference speed when the machining apparatus is not performing a machining operation at the first conveyance completion estimated time and to be a low speed lower than the reference speed when the machining apparatus is performing the machining operation at the first conveyance completion estimated time.

14 Claims, 12 Drawing Sheets

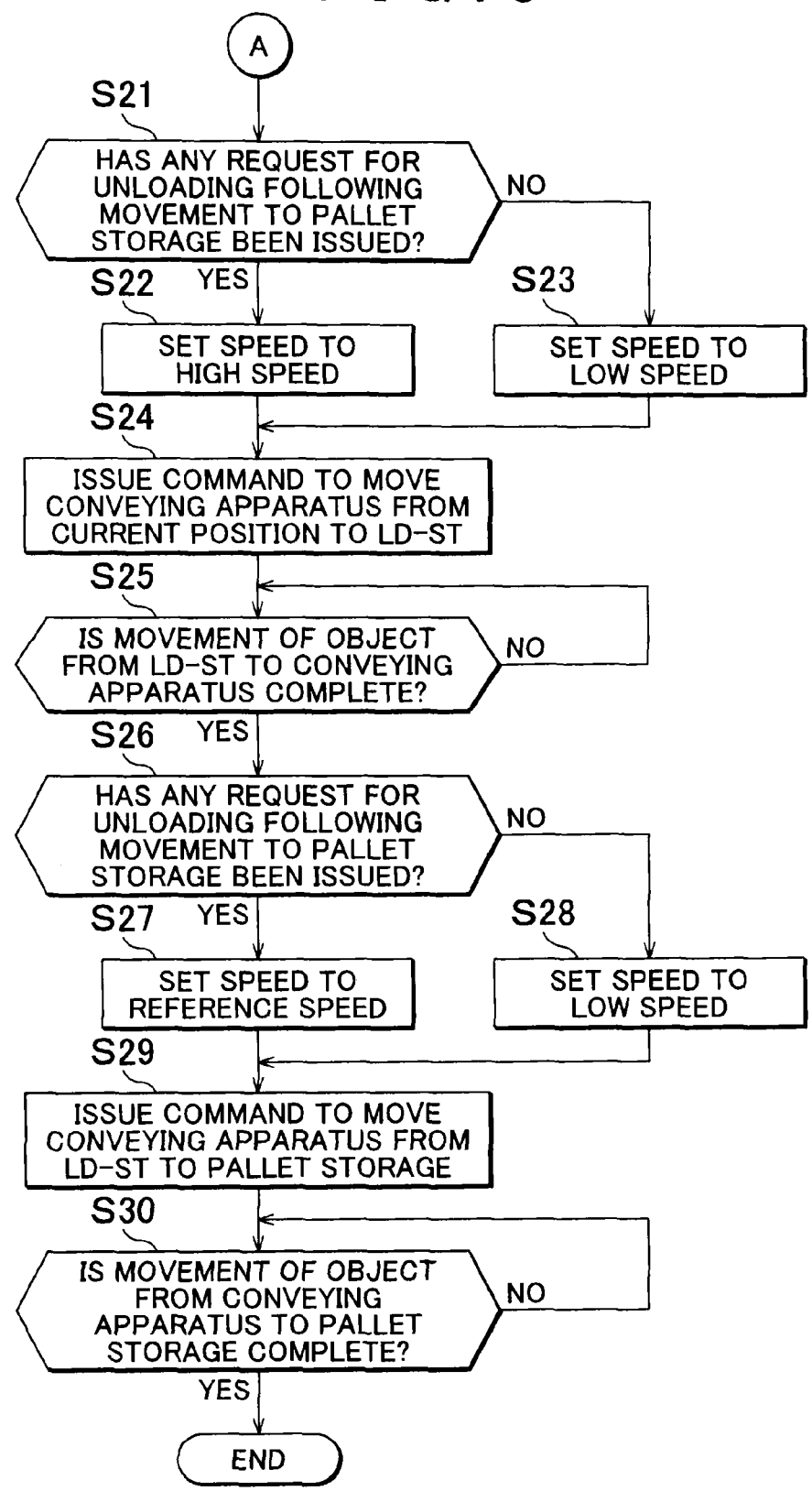

CONVEYANCE SYSTEM FOR MACHINING APPARATUS

INCORPORATION BY REFERENCE

The disclosure of Japanese Patent Application No. 2014-120301 filed on Jun. 11, 2014 including the specification, drawings and abstract, is incorporated herein by reference in its entirety.

BACKGROUND OF THE INVENTION

1. Field of the Invention

The present invention relates to a conveyance system including a conveying apparatus that conveys a machining object to a machining apparatus and a controller that controls the conveying apparatus.

2. Description of Related Art

Japanese Utility Model Laid-Open No. H4-58712 (JP H4-58712 U), Japanese Patent Application Publication No. 2004-123350 (JP 2004-123350 A), Japanese Patent Application Publication No. S62-218393 (JP S62-218393 A), and Japanese Patent Application Publication No. 2012-76858 (JP 2012-76858 A) describe the cases of conveying various objects with a conveying apparatus while changing the moving speed of the conveying apparatus depending on modes, which achieves power saving.

In a conveyance system that conveys an object to a machining apparatus using a conveying apparatus, when the conveying apparatus conveys the object to the machining apparatus, the conveyed object needs to stand by at the machining apparatus if the machining apparatus is machining another object. In other words, even when the speed of the conveying apparatus is reduced, a machining time is not affected. However, the related art makes no consideration for the state of the machining apparatus. Thus, taking the state of the machining apparatus into account allows the power consumption of the conveyance system to be improved.

SUMMARY OF THE INVENTION

An object of the present invention is to provide a conveyance system that conveys an object to a machining apparatus using a conveying apparatus and further enables power saving.

A conveyance system according to an aspect of the present invention includes:

a conveying apparatus that conveys a machining object to a machining apparatus; and a controller that controls the conveying apparatus. In the conveyance system, a first state is defined as a state where, if a next destination to which the object is to be conveyed by the conveying apparatus is the machining apparatus and when the object is mounted onto the conveying apparatus at a first mounting position that the conveying apparatus leaves after the object is mounted onto the conveying apparatus, the conveying apparatus with the object mounted thereon conveys the object from the first mounting position to the machining apparatus, the controller includes:

estimated time calculation circuitry that calculates a first conveyance completion estimated time when conveyance from the first mounting position to the machining apparatus at a preset reference speed is complete, and moving speed decision circuitry that, if the machining apparatus issues a request to load a next object into the machining apparatus, decides a first moving speed of the conveying apparatus in the first state to be the reference speed when the machining apparatus is not performing a machining operation at the first conveyance completion estimated time and to be a low speed lower than the reference speed when the machining apparatus is performing the machining operation at the first conveyance completion estimated time, and the conveying apparatus moves from the first mounting position to the machining apparatus at the first moving speed.

If the machining apparatus is performing the machining operation at the first conveyance completion estimated time, when the controller allows the conveying apparatus to move at the reference speed, the conveyed object needs to stand by at the machining apparatus. Thus, if the machining apparatus is performing the machining operation at the first conveyance completion estimated time, the controller allows the conveying apparatus to move at a speed lower than the reference speed. Even when the conveying apparatus moves at the low speed, only a reduction in standby time of the conveying apparatus occurs, and the machining standby time of the machining apparatus can be prevented from being extended. The movement of the conveying apparatus at the low speed reduces the power consumption of the conveying apparatus. The movement of the conveying apparatus at the low speed further extends the life of the conveying apparatus. The first mounting position means a position that the conveying apparatus leaves after the object is loaded onto the conveying apparatus when the next destination to which the object is to be conveyed by the conveying apparatus is the machining apparatus.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 3 is a flowchart illustrating processing in A in FIG. 2;

DETAILED DESCRIPTION OF EMBODIMENTS

A configuration of a flexible manufacturing system (hereinafter referred to as FMS) to which a conveyance system in the present embodiment is applied will be described with reference to FIG. 1. The FMS is a system that machines a workpiece W attached to a pallet P using a first machining apparatus 11 or a second machining apparatus 12. The workpiece W is sequentially machined based on a preset production schedule.

Figure 1:
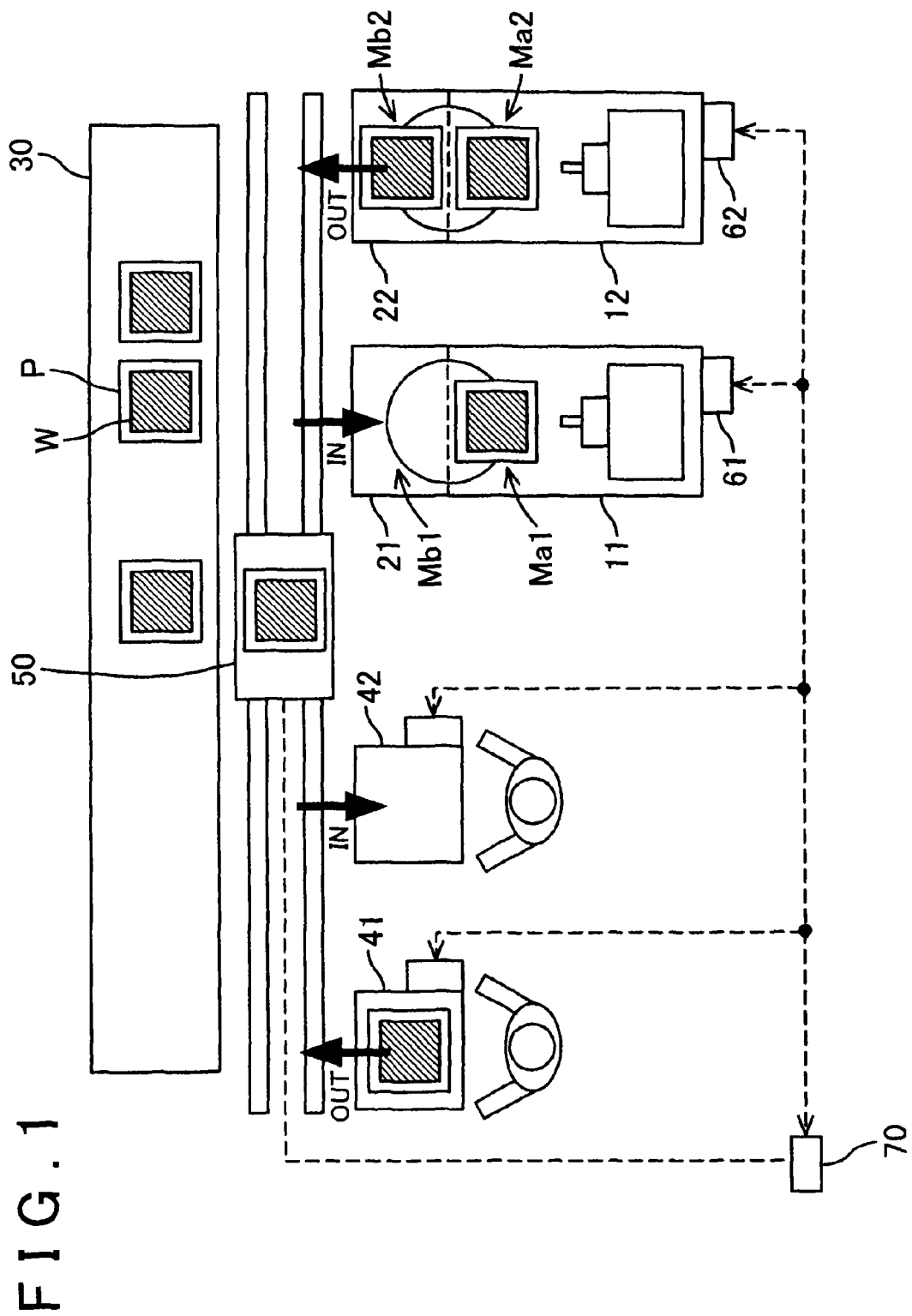
FIG. 1 is a general configuration diagram of a flexible manufacturing system according to an embodiment of the present invention.

As depicted in FIG. 1, the FMS includes the first and second machining apparatuses 11 and 12, first and second pallet changers 21 and 22, a pallet storage 30, loading stations (LD-STs) 41 and 42, a conveying apparatus 50, first and second CNC controllers 61 and 62, and a cell controller 70.

The first and second machining apparatuses 11 and 12 machine the workpiece W that has not been machined. The first and second machining apparatuses 11 and 12 are illustrated as, for example, machining centers, but other types of machine tools are also applicable as the first and second machining apparatuses 11 and 12. The first and second machining apparatuses 11 and 12 include machining positions Ma1 and Ma2, respectively, where a pallet P with the workpiece W attached thereto is arranged. The first machining apparatus 11 includes one machining position Ma1, and the second machining apparatus 12 includes one machining position Ma2. The first and second machining apparatuses 11 and 12 machine the workpieces W attached to the pallets P arranged at the machining positions Ma1 and Ma2, respectively, and shape the machined products.

In the configuration of the FMS, the same type of machining center (machining apparatus) is applied to the first machining apparatus 11 and the second machining apparatus 12. Tools stored in respective tool magazines of the first machining apparatus 11 and the second machining apparatus 12 may all be of the same types. In this case, the workpiece W that can be machined by the first machining apparatus 11 is the same as the workpiece W that can be machined by the second machining apparatus 12. On the other hand, even when the same type of machining center is applied to the first machining apparatus 11 and the second machining apparatus 12, different types of tools may be stored in the respective tool magazines. In this case, machining certain workpieces W is possible using the first machining apparatus 11 but is impossible using the second machining apparatus 12. In the description below of the present embodiment, the first machining apparatus 11 and the second machining apparatus 12 are the same type of machining center and have the same types of tools, by way of example.

The first and second pallet changers 21 and 22 are integrally provided in the first and second machining apparatuses 11 and 12 or adjacent to the first and second machining apparatuses 11 and 12, respectively. The first and second pallet changers 21 and 22 include standby positions Mb1 and Mb2, respectively, where the pallets P stand by which are to be moved to the machining positions Ma1 and Ma2 on the first and second machining apparatuses 11 and 12. The first and second pallet changers 21 and 22 change the pallets P at the machining positions Ma1 and Ma2 on the first and second machining apparatuses 11 and 12 with the pallets P at the standby positions Mb1 and Mb2. In other words, the first and second pallet changers 21 and 22 are operated to move the workpieces W that have not been machined, from the standby positions Mb1 and Mb2 to the machining positions Ma1 and Ma2 and to move machined products shaped by the first and second machining apparatuses 11 and 12, from the machining positions Ma1 and Ma2 to the standby positions Mb1 and Mb2.

The pallet storage 30 stores a plurality of pallets P. The workpieces W attached to the pallets P stored in the pallet storage 30 include workpieces that have not been machined, machined products, and abnormal articles.

The LD-STs 41 and 42 are places where operators load the pallets P with new workpieces W attached thereto into the FMS. The LD-STs 41 and 42 are also places where the operators receive machined products. In other words, the LD-STs 41 and 42 are places where the operators load the workpieces W into the FMS or unload the workpieces W from the FMS. The places where the loading and unloading of the workpieces W are performed are not limited to the LD-STs 41 and 42, and various configurations are applicable. In the present embodiment, the two LD-STs are illustrated.

The conveying apparatus 50 can move on a linear rail provided between: the pallet storage 30; and the first and second machining apparatuses 11 and 12 and the LD-STs 41 and 42. When a rail-guided vehicle (RGV) is used as the conveying apparatus 50, the conveying apparatus moves on two rails. When a stacker crane is used as the conveying apparatus 50, the conveying apparatus moves along one rail. In FIG. 1, the conveying apparatus 50 can move in a lateral direction. The conveying apparatus 50 can convey the pallet P among the pallet storage 30, the LD-STs 41 and 42, and the standby positions Mb1 and Mb2 on the first and second pallet changers 21 and 22.

The first CNC system controller 61 controls the first machining apparatus 11 and the first pallet changer 21. The second CNC system controller 62 controls the second machining apparatus 12 and the second pallet changer 22. Specifically, the CNC system controllers 61 and 62 control machining operations and the like performed by the machining apparatuses 11 and 12 and pallet change operations of the pallet changers 21 and 22.

The cell controller 70 controls the conveying apparatus 50. The cell controller 70 controls the conveying apparatus 50 such that machining is performed in accordance with the stored priorities of the workpieces W. The priorities are input to the LD-STs 41 and 42 by the operators when new workpieces are loaded onto the LD-STs 41 and 42. The cell controller 70 acquires signals from the LD-STs 41 and 42 to decide the priorities of the workpieces. The cell controller 70 further decides the moving speed of the conveying apparatus 50 and outputs a command for the moving speed to the conveying apparatus 50.

The loading into the LD-STs 41 and 42 is processing that is depicted by arrow "IN" near the LD-ST 42 in FIG. 1 and in which the LD-STs 41 and 42 receive pallets (objects) from the conveying apparatus 50. The unloading from the LD-STs 41 and 42 is processing that is depicted by arrow "OUT" near the LD-ST 41 in FIG. 1 and in which the pallets are moved from the LD-STs 41 and 42 to the conveying apparatus 50. The loading into the first and second machining apparatuses 11 and 12 is processing that is depicted by arrow "IN" near the first machining apparatus 11 in FIG. 1 and in which the first and second machining apparatuses 11 and 12 receive the pallets from the conveying apparatus 50. The unloading from the first and second machining apparatuses 11 and 12 is processing that is depicted by arrow "OUT" near the second machining apparatus 12 in FIG. 1 and in which the pallets are moved from the first and second machining apparatuses 11 and 12 to the conveying apparatus 50.

Now, a loading request and an unloading request will be described. Unloading requests from the LD-STs 41 and 42 are output to the FMS by the operators loading the pallets P with new workpieces W attached thereto onto the LD-STs 41 and 42. Loading requests from the LD-STs 41 and 42 are output to the FMS by the operators inputting commands to receive machined products to the LD-STs 41 and 42. Unloading requests from the machining apparatuses 11 and 12 are output to the FMS when the machining apparatuses 11 and 12 have formed machined products. In other words, the unloading requests from the machining apparatuses 11 and 12 are requests to move the machined products from the machining apparatuses 11 and 12. Loading requests from the machining apparatuses 11 and 12 are output to the FMS when the machining apparatuses 11 and 12 are to receive the next workpieces W to be machined.

In the present embodiment, the cell controller 70 decides the moving speed of the conveying apparatus 50 and outputs a command for the moving speed to the conveying apparatus 50. The cell controller 70 outputs three types of commands for the moving speed, that is, commands for a preset reference speed, a speed higher than the reference speed, and a speed lower than the reference speed, according to the situation. The high speed, reference speed, and low speed as commands for the moving speed may each be divided into a plurality of stages according to the situation. The reference speed is a standard speed for a state where an object with a standard mass is loaded on the conveying apparatus 50.

A basic method for deciding the moving speed is as follows. The moving speed of the conveying apparatus 50 with no object mounted thereon is a high speed. The high speed of the conveying apparatus 50 may be the maximum speed at which the conveying apparatus 50 with no object mounted thereon can move. The moving speed of the conveying apparatus 50 with the object mounted thereon is the reference speed. However, when the conveying apparatus 50 loads the objects onto the machining apparatuses 11 and 12, if the machining apparatuses 11 and 12 are performing a machining operation and the objects need to stand by, the moving speed of the conveying apparatus 50 is the low speed. When no next conveyance command is issued after the conveying apparatus 50 moves the object to the pallet storage 30, the moving speed of the conveying apparatus 50 is the low speed. When the objects are loaded onto the LD-STs 41 and 42, the operators are standing by, and thus, the moving speed is the reference speed or the high speed. In the description below, if the objects are moved from the conveying apparatus 50 to machining apparatuses 11 and 12 or if the objects are moved in the opposite direction, then in the above-described configuration, the objects move via the pallet changers 21 and 22. However, in the description below, the pallet changers 21 and 22 will not be described for simplification of description.

Figure 2:
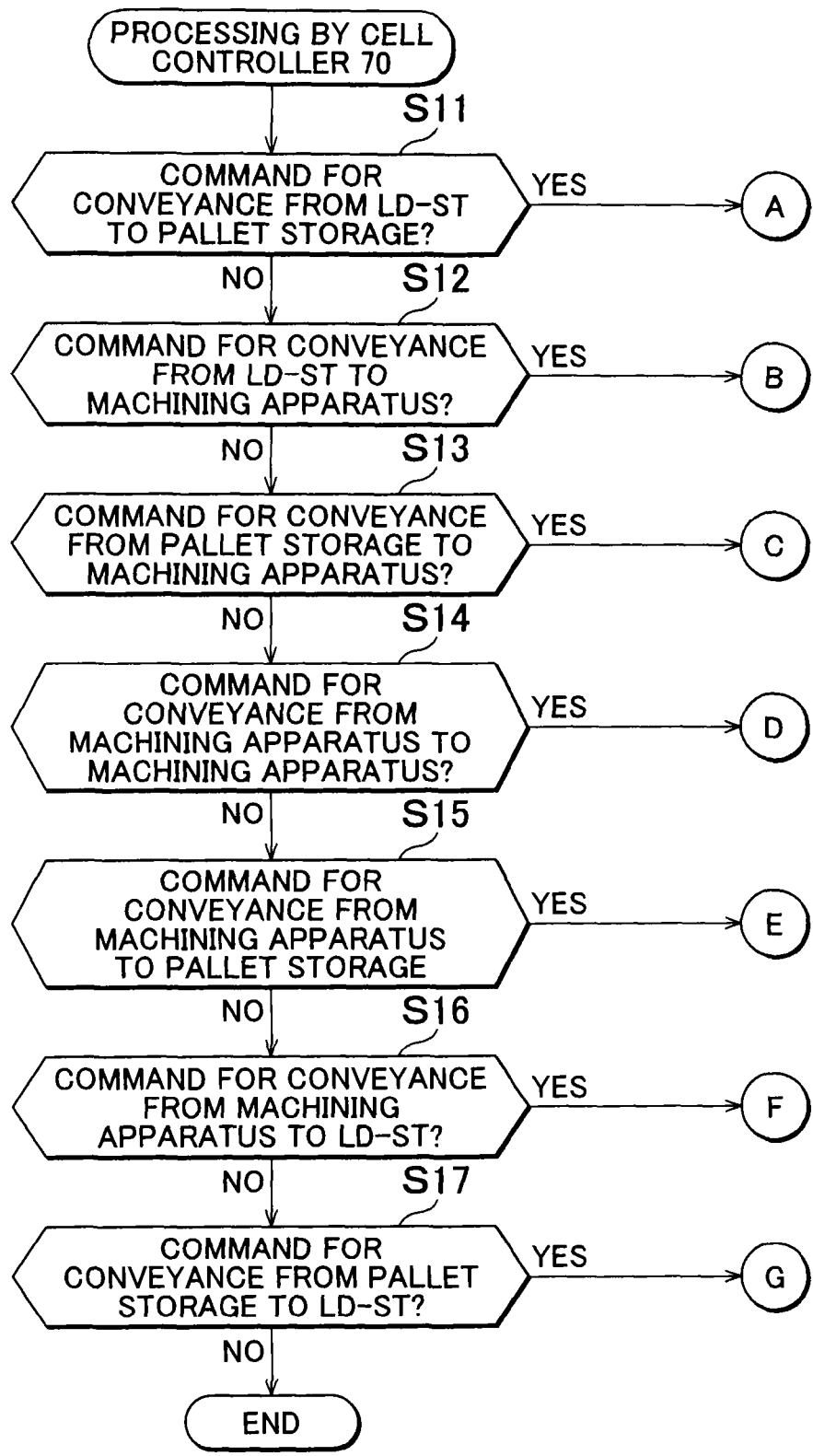
FIG. 2 is a flowchart illustrating processing by a cell controller in FIG. 1.

The cell controller 70 decides a conveyance order and executes processing according to the decided conveyance order (FIG. 2). S in FIG. 2 designates each step of the control performed by the cell controller 70. When a command for conveyance from the LD-STs 41 and 42 to the pallet storage 30 is output (S11: Yes), the cell controller 70 executes processing in A depicted in FIG. 3. When a command for conveyance from the LD-STs 41 and 42 to the machining apparatuses 11 and 12 is output (S12: Yes), the cell controller 70 executes processing in B depicted in FIG. 4A and FIG. 4B. When a command for conveyance from the pallet storage 30 to the machining apparatuses 11 and 12 is output (S13: Yes), the cell controller 70 executes processing in C depicted in FIG. 5A and FIG. 5B**.

When a command for conveyance from a first machining apparatus to a second machining apparatus among the machining apparatuses 11 and 12 is output (S 14: Yes), the cell controller 70 executes processing in D depicted in FIG. 6A and FIG. 6B. When a command for conveyance from the machining apparatuses 11 and 12 to the pallet storage 30 is output (S15: Yes), the cell controller 70 executes processing in E depicted in FIG. 7. When a command for conveyance from the machining apparatuses 11 and 12 to the LD-STs 41 and 42 is output (S 16: Yes), the cell controller 70 executes processing in F depicted in FIG. 8. When a command for conveyance from the pallet storage 30 to the LD-STs 41 and 42 is output (S 17: Yes), the cell controller 70 executes processing in G depicted in FIG. 9.

Processing of conveyance from the LD-STs to the pallet storage will be described below. When the workpieces W are mounted onto the conveying apparatus 50 at the LD-STs 41 and 42 (second mounting position) and the command for conveyance from the LD-STs 41 and 42 to the pallet storage 30 is output (S11 in FIG. 2: Yes), the cell controller 70 decides the moving speed of the conveying apparatus 50 from the current position to the LD-STs 41 and 42 (the moving speed corresponds to a fourth moving speed in a fourth state in the present invention) as depicted in FIG. 3. The cell controller 70 decides whether or not a request for unloading following the movement of the conveying apparatus 50 to the pallet storage 30 has been issued (S21). When the following unloading request has been issued, the cell controller 70 sets the moving speed of the conveying apparatus 50 (corresponding to the above-described fourth moving speed) to the high speed (S22). Since no object is mounted on the conveying apparatus 50 (this state is hereinafter referred to as an unmounted state), the conveying apparatus 50 can move at the high speed.

On the other hand, when the following unloading request has not been issued, the cell controller 70 sets the moving speed of the conveying apparatus 50 (corresponding to the above-described fourth moving speed) to the low speed (S23). Since the following unloading request has not been issued, the conveying apparatus 50 will need to stand by if moving at the high speed. The conveying apparatus 50 is thus moved at the low speed to shorten the standby time of the conveying apparatus 50, while reducing the power consumption thereof.

Subsequently, the cell controller 70 outputs a command to move the conveying apparatus 50 from the current position of the conveying apparatus 50 to the LD-STs 41 and 42 (S24). Upon receiving the movement command, the conveying apparatus 50 moves from the current position to the LD-STs 41 and 42 at the decided speed. Then, the objects are moved from the LD-STs 41 and 42 to the conveying apparatus 50. The cell controller 70 continues the processing until the movement of the objects is complete (S25).

When the movement of the objects is complete (S25: Yes), the cell controller 70 decides the moving speed of the conveying apparatus 50 from the LD-STs 41 and 42 to the pallet storage 30 (the moving speed corresponds to a third moving speed in a third state in the present invention). The cell controller 70 determines whether or not a request for unloading following the movement to the pallet storage 30 has been issued (S26). When the following unloading request has been issued, the cell controller 70 sets the moving speed of the conveying apparatus 50 (corresponding to the above-described third moving speed) to the reference speed (S27). Since the objects are mounted on the conveying apparatus 50, the conveying apparatus 50 moves at the reference speed (that is lower than the high speed) instead of moving at the high speed.

On the other hand, when the following unloading request has not been issued, the cell controller 70 sets the moving speed of the conveying apparatus 50 (corresponding to the above-described third moving speed) to the low speed (S28). Since the following unloading request has not been issued, the conveying apparatus 50 will need to stand by if moving at the reference speed. The conveying apparatus 50 is thus moved at the low speed to shorten the standby time of the conveying apparatus 50, while reducing the power consumption thereof.

Subsequently, the cell controller 70 outputs a command to move the conveying apparatus 50 from the LD-STs 41 and 42 to the pallet storage 30 (S29). Upon receiving the movement command, the conveying apparatus 50 moves from the LD-STs 41 and 42 to the pallet storage 30 at the decided speed. Then, the objects are moved from the conveying apparatus 50 to the pallet storage 30. Upon completing the movement of the objects, the cell controller 70 ends the processing (S30).

Now, processing for conveyance from the LD-STs to the machining apparatuses will be described. When the workpieces W are mounted onto the conveying apparatus 50 at the LD-STs 41 and 42 (corresponding to a first mounting position in the present invention) and a command for conveyance from the LD-STs 41 and 42 to the machining apparatuses 11 and 12 is output (FIG. 2, S12: Yes), the cell controller 70 decides the moving speed from the current position to the LD-STs 41 and 42 (the moving speed corresponds to a second moving speed in a second state in the present invention) as depicted in FIG. 4A.

Figure 4A:
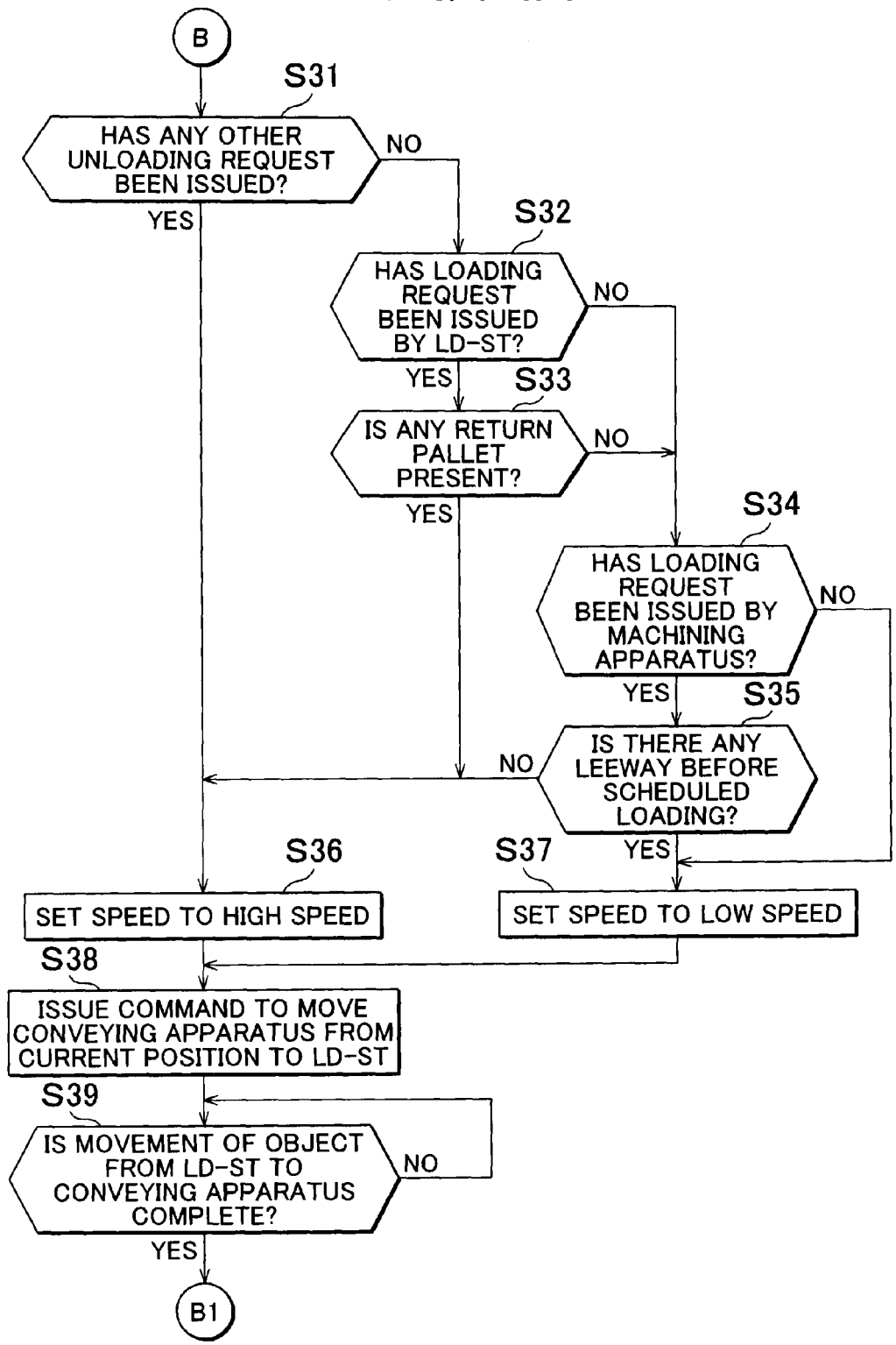
FIG. 4A is a flowchart illustrating processing in B in FIG. 2.

As depicted in FIG. 4A, the cell controller 70 determines whether or not any other unloading request has been issued (S31). When another unloading request has been issued, the cell controller 70 sets the moving speed (corresponding to the above-described second moving speed) to the high speed (S36). When the conveying apparatus 50 moves in the unmounted state, the mass of the whole moving body is reduced by an amount corresponding to the mass of the objects. Thus, the conveying apparatus 50 originally has low power consumption. Consequently, even when the conveying apparatus 50 is moved at the high speed, the power consumption thereof can be sufficiently suppressed. On the other hand, when no other unloading request has been issued (S31: No), loading requests have been issued by the LD-STs 41 and 42 (S32: Yes), and return pallets Pr (pallets that can be returned to the LD-STs) are present (S33: Yes), the cell controller 70 also sets the moving speed of the conveying apparatus 50 to the high speed (S36).

When no loading requests have been issued by the LD-STs 41 and 42 (S32: No) or no return pallets Pr are present (S33: No), the cell controller 70 determines whether or not loading requests have been issued by the machining apparatuses 11 and 12 (S34). When loading requests have been issued by the machining apparatuses 11 and 12 (S34: Yes), the cell controller 70 determines whether or not there is any leeway before the scheduled loading (S35).

Whether or not there is any leeway before the scheduled loading is decided as follows. The cell controller 70 calculates a conveyance completion estimated time when the conveying apparatus 50 moving from the current position at the reference speed reaches the machining apparatuses 11 and 12 via the LD-STs 41 and 42 (the time corresponds to a second conveyance completion estimated time in the present invention). Subsequently, the cell controller 70 determines whether or not the machining apparatuses 11 and 12 are performing a machining operation at the second conveyance completion estimated time. When the machining apparatuses 11 and 12 are performing the machining operation at the second conveyance completion estimated time, the cell controller 70 determines that there is a leeway before the scheduled loading. When the machining apparatuses 11 and 12 are not performing the machining operation at the second conveyance completion estimated time, the cell controller 70 determines that there is no leeway before the scheduled loading.

Upon determining that there is no leeway before the scheduled loading (S35: No), the cell controller 70 sets the moving speed of the conveying apparatus 50 to the high speed (S36). On the other hand, upon determining that there is a leeway before the scheduled loading (S35: Yes), the cell controller 70 sets the moving speed of the conveying apparatus 50 to the low speed (S37). The conveying apparatus 50 will need to stand by if moving at the reference speed. The conveying apparatus 50 is thus moved at the low speed to shorten the standby time of the conveying apparatus 50, while reducing the power consumption thereof. If there is a leeway before the scheduled loading, even when the conveying apparatus 50 moves at the low speed, only a reduction in the standby time of the conveying apparatus 50 occurs, and the machining standby time of the machining apparatuses 11 and 12 can be prevented from being extended. In particular, when the low speed of the conveying apparatus 50 is set to allow the conveying apparatus 50 to reach the machining apparatuses 11 and 12 at a scheduled time when the machining apparatuses 11 and 12 are to complete the machining or earlier than the scheduled time, the machining standby time of the machining apparatuses 11 and 12 can be more reliably prevented from being extended.

The cell controller 70 also sets the moving speed of the conveying apparatus 50 to the low speed (S37) when no loading requests have been issued by the machining apparatuses 11 and 12 (S34: No). No requests from the machining apparatuses 11 and 12 for loading of next objects means that the machining apparatuses 11 and 12 are not ready to accept the next objects. Thus, even when the conveying apparatus 50 conveys objects to the positions of the machining apparatuses 11 and 12, the machining apparatuses 11 and 12 fail to receive the objects. Therefore, the conveying apparatus 50 stands by until the machining apparatuses 11 and 12 make ready to accept the objects. Naturally, even when conveying apparatus 50 conveys objects to the positions of the machining apparatuses 11 and 12, the machining apparatuses 11 and 12 do not receive the objects and thus do not immediately start machining the objects. Thus, also in this case, the moving speed of the conveying apparatus 50 is set to the low speed to shorten the standby time of the conveying apparatus 50, while reducing the power consumption thereof.

Subsequently, the cell controller 70 outputs a command to move the conveying apparatus 50 from the current position to the LD-STs 41 and 42 (S38). Upon receiving the movement command, the conveying apparatus 50 moves from the current position to the LD-STs 41 and 42 at the decided speed. Then, the objects are moved from the LD-STs 41 and 42 to the conveying apparatus 50. The cell controller 70 continues the processing until the movement of the objects is complete (S39).

Figure 4B:
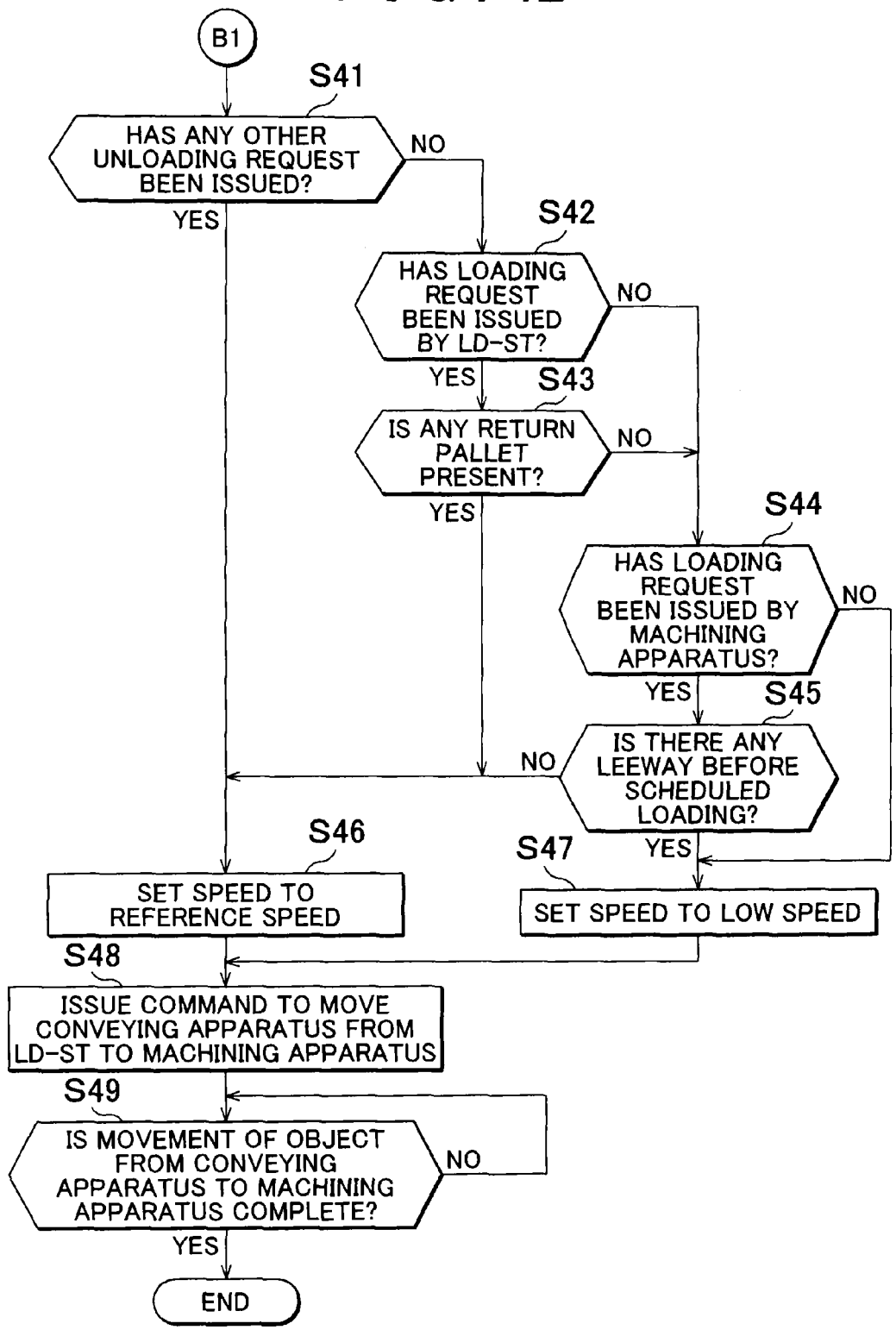
FIG. 4B is a flowchart illustrating processing continued from B1 in FIG. 4A.

Then, as depicted in FIG. 4B, the cell controller 70 decides the moving speed from the LD-STs 41 and 42 to the machining apparatuses 11 and 12 (the moving speed corresponds to a first moving speed in a first state in the present invention). The cell controller 70 determines whether or not any other unloading request has been issued (S41). When another unloading request has been issued, the cell controller 70 sets the moving speed of the conveying apparatus 50 (corresponding to the above-described first moving speed) to the reference speed (S46). Since the objects are mounted on the conveying apparatus 50, the conveying apparatus 50 moves at the reference speed (that is lower than the high speed) instead of moving at the high speed. On the other hand, when no other unloading request has been issued (S41: No), loading requests have been issued by the LD-STs 41 and 42 (S42: Yes), and return pallets Pr are present (S43: Yes), the cell controller 70 also sets the moving speed of the conveying apparatus 50 to the reference speed (S46).

When no loading requests have been issued by the LD-STs 41 and 42 (S42: No) or no return pallets Pr are present (S43: No), the cell controller 70 determines whether or not loading requests have been issued by the machining apparatuses 11 and 12 (S44). When loading requests have been issued by the machining apparatuses 11 and 12 (S44: Yes), the cell controller 70 determines whether or not there is any leeway before the scheduled loading (S45).

Whether or not there is any leeway before the scheduled loading is determined as follows. Estimated time calculation circuitry provided in the cell controller 70 calculates a conveyance completion estimated time when the conveying apparatus 50 completes conveyance from the LD-STs 41 and 42 to the machining apparatuses 11 and 12 at the reference speed (the time corresponds to a first conveyance completion estimated time in the present invention). Subsequently, the cell controller 70 determines whether or not the machining apparatuses 11 and 12 are performing the machining operation at the first conveyance completion estimated time. When the machining apparatuses 11 and 12 are performing the machining operation at the first conveyance completion estimated time, moving speed decision circuitry provided in the cell controller 70 determines that there is a leeway before the scheduled loading. When the machining apparatuses 11 and 12 are not performing the machining operation at the first conveyance completion estimated time, the cell controller 70 determines that there is no leeway before the scheduled loading.

When the determination that there is no leeway before the scheduled loading is made (S45: No), the moving speed decision circuitry provided in the cell controller 70 sets the moving speed of the conveying apparatus 50 to the reference speed (S46). On the other hand, when the determination that there is a leeway before the scheduled loading is made (S45: Yes), the moving speed decision circuitry sets the moving speed of the conveying apparatus 50 to the low speed (S47). The conveying apparatus 50 will need to stand by if moving at the reference speed. The conveying apparatus 50 is thus moved at the low speed to shorten the standby time of the conveying apparatus 50, while reducing the power consumption thereof. When no loading requests have been issued by the machining apparatuses 11 and 12 (S44: No), the cell controller 70 also sets the moving speed of the conveying apparatus 50 to the low speed to shorten the standby time of the conveying apparatus 50, while reducing the power consumption thereof.

Subsequently, the cell controller 70 outputs a command to move the conveying apparatus 50 from the LD-STs 41 and 42 to the machining apparatuses 11 and 12 (S48). Upon receiving the movement command, the conveying apparatus 50 moves from the LD-STs 41 and 42 to the machining apparatuses 11 and 12 at the decided speed. Then, the objects are moved from the conveying apparatus 50 to the machining apparatuses 11 and 12. The cell controller 70 ends the processing when the movement of the objects is complete (S49).

Now, processing for conveyance from the pallet storage to the machining apparatuses will be described.

When the workpieces W are mounted onto the conveying apparatus 50 at the pallet storage 30 (corresponding to the first mounting position in the present invention) and a command for conveyance from the pallet storage 30 to the machining apparatuses 11 and 12 is output (FIG. 2, S13: Yes), the cell controller 70 decides the moving speed from the current position to the pallet storage 30 (the moving speed corresponds to the second moving speed in the second state in the present invention) as depicted in FIG. 5A.

Figure 5A:
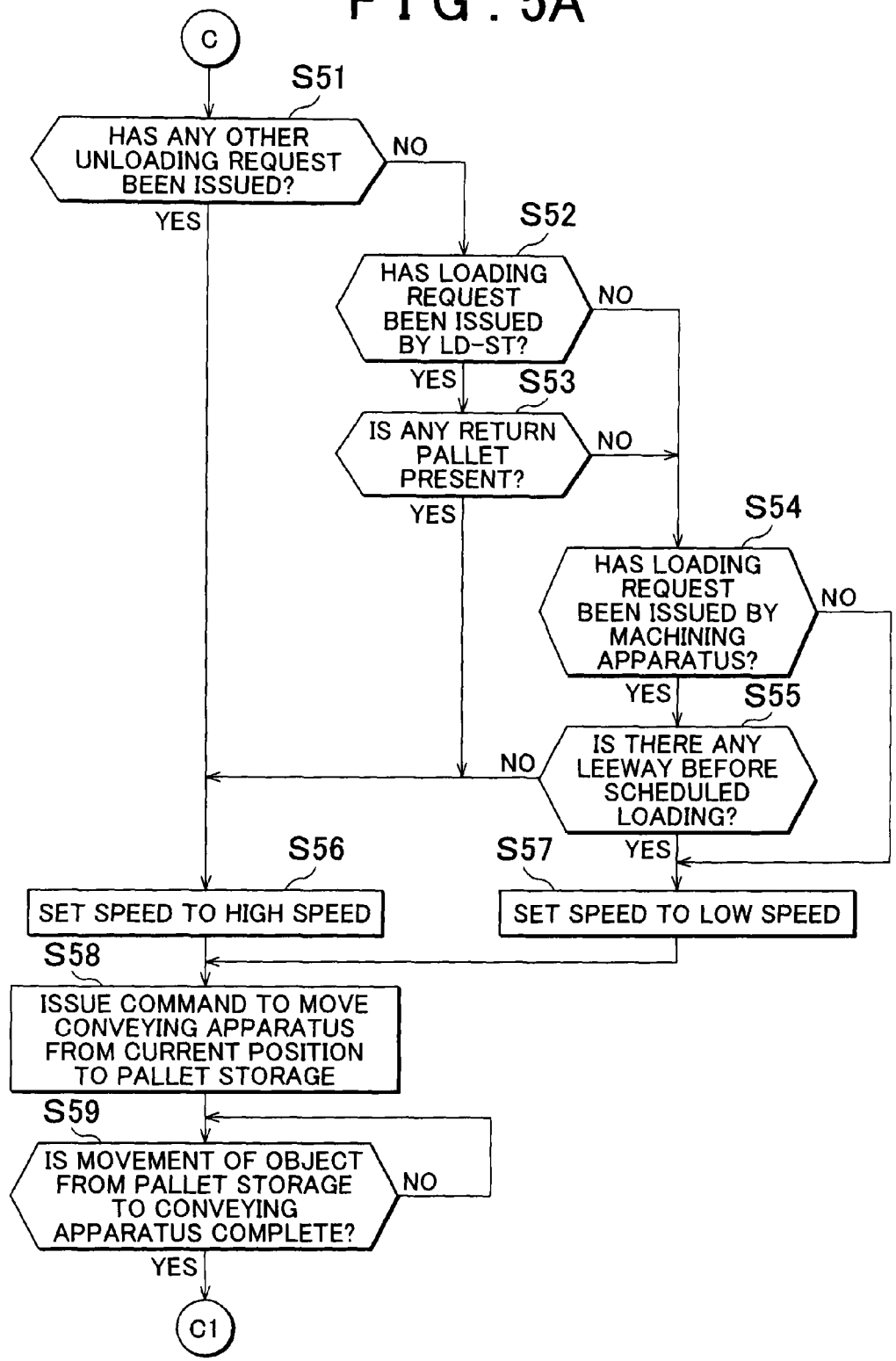
FIG. 5A is a flowchart illustrating processing in C in FIG. 2.

As depicted in FIG. 5A, the cell controller 70 determines whether or not any other unloading request has been issued (S51). When another unloading request has been issued, the cell controller 70 sets the moving speed (corresponding to the above-described second moving speed) to the high speed (S56). The conveying apparatus 50 is in the unmounted state and can thus move at the high speed, while sufficiently suppressing the power consumption thereof. On the other hand, when no other unloading request has been issued (S51: No), loading requests have been issued by the LD-STs 41 and 42 (S52: Yes), and return pallets Pr are present (S53: Yes), the cell controller 70 also sets the moving speed of the conveying apparatus 50 to the high speed (S56).

When no loading requests have been issued by the LD-STs 41 and 42 (S52: No) or no return pallets Pr are present (S53: No), the cell controller 70 determines whether or not loading requests have been issued by the machining apparatuses 11 and 12 (S54). When loading requests have been issued by the machining apparatuses 11 and 12 (S54: Yes), the cell controller 70 determines whether or not there is any leeway before the scheduled loading (S55). Determination of whether or not there is any leeway before the scheduled loading in this case is performed substantially as is the case with the processing for conveyance from the LD-STs 41 and 42 to the machining apparatuses 11 and 12.

Upon determining that there is no leeway before the scheduled loading (S55: No), the cell controller 70 sets the moving speed of the conveying apparatus 50 to the high speed (S56). On the other hand, upon determining that there is a leeway before the scheduled loading (S55: Yes), the cell controller 70 sets the moving speed of the conveying apparatus 50 to the low speed (S57). The conveying apparatus 50 will need to stand by if moving at the reference speed. The conveying apparatus 50 is thus moved at the low speed to shorten the standby time of the conveying apparatus 50, while reducing the power consumption thereof.

When no loading requests have been issued by the machining apparatuses 11 and 12 (S54: No), the cell controller 70 also sets the moving speed of the conveying apparatus 50 to the low speed (S57). Also in this case, the moving speed of the conveying apparatus 50 is set to the low speed to shorten the standby time of the conveying apparatus 50, while reducing the power consumption thereof.

Subsequently, the cell controller 70 outputs a command to move the conveying apparatus 50 from the current position to the pallet storage 30 (S58). Upon receiving the movement command, the conveying apparatus 50 moves from the current position to the pallet storage 30 at the decided speed. Then, the objects are moved from the pallet storage 30 to the conveying apparatus 50. The cell controller 70 continues the processing until the movement of the objects is complete (S59).

Figure 5B:
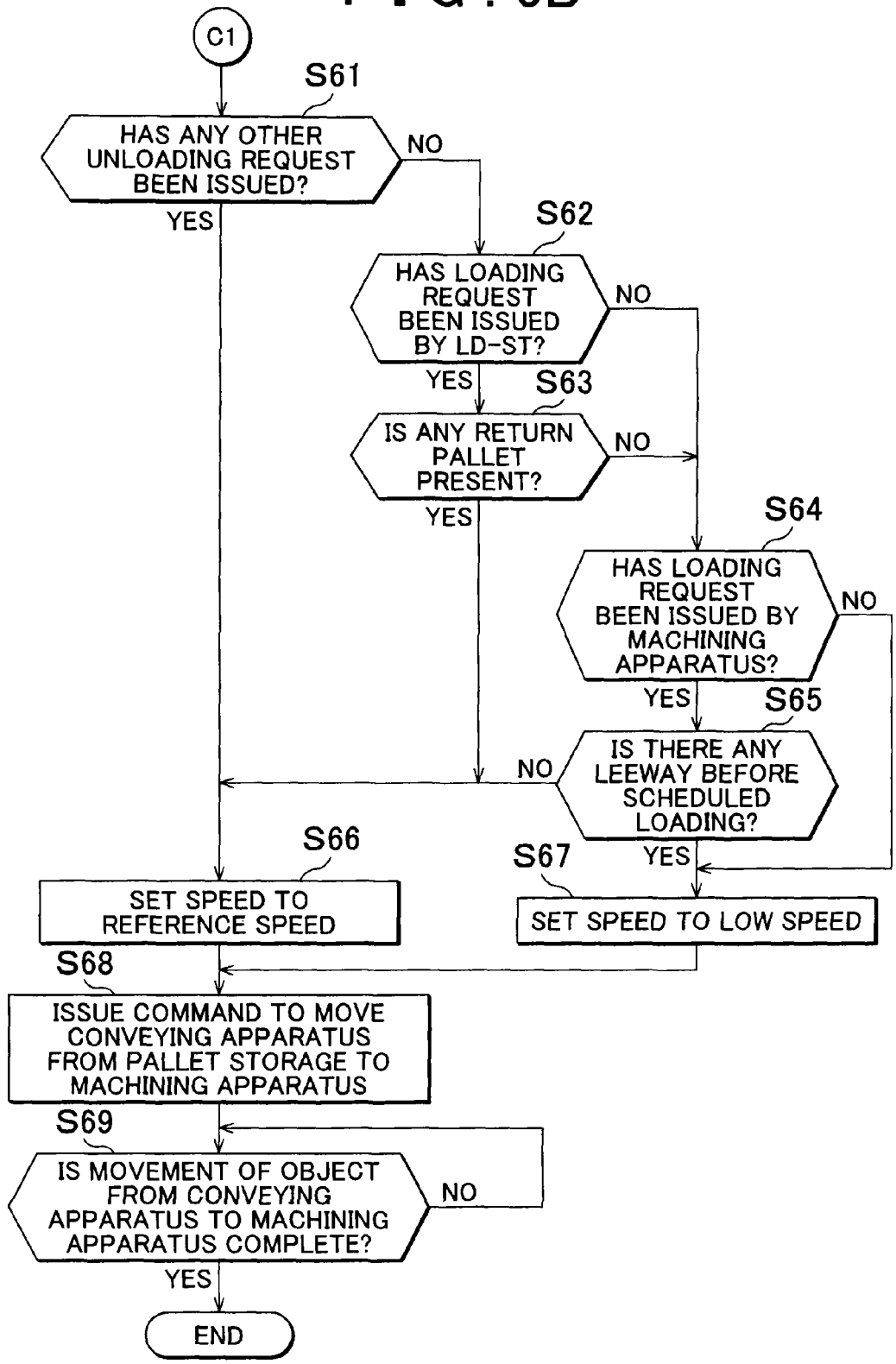
FIG. 5B is a flowchart illustrating processing continued from C1 in FIG. 5A.

Then, as depicted in FIG. 5B, the cell controller 70 decides the moving speed from the pallet storage 30 to the machining apparatuses 11 and 12 (the moving speed corresponds to the first moving speed in the first state in the present invention). The cell controller 70 determines whether or not any other unloading request has been issued (S61). When another unloading request has been issued, the cell controller 70 sets the moving speed of the conveying apparatus 50 (corresponding to the above-described first moving speed) to the reference speed (S66). Since the objects are mounted on the conveying apparatus 50, the conveying apparatus 50 moves at the reference speed (that is lower than the high speed) instead of moving at the high speed. On the other hand, when no other unloading request has been issued (S61: No), loading requests have been issued by the LD-STs 41 and 42 (S62: Yes), and return pallets Pr are present (S63: Yes), the cell controller 70 also sets the moving speed of the conveying apparatus 50 to the reference speed (S66).

When no loading requests have been issued by the LD-STs 41 and 42 (S62: No) or no return pallets Pr are present (S63: No), the cell controller 70 determines whether or not loading requests have been issued by the machining apparatuses 11 and 12 (S64). When loading requests have been issued by the machining apparatuses 11 and 12 (S64: Yes), the cell controller 70 determines whether or not there is any leeway before the scheduled loading (S65). Determination of whether or not there is any leeway before the scheduled loading in this case is performed substantially as is the case with the processing for conveyance from the LD-STs 41 and 42 to the machining apparatuses 11 and 12.

Upon determining that there is no leeway before the scheduled loading (S65: No), the cell controller 70 sets the moving speed of the conveying apparatus 50 to the reference speed (S66). On the other hand, upon determining that there is a leeway before the scheduled loading (S65: Yes), the cell controller 70 sets the moving speed of the conveying apparatus 50 to the low speed (S67). The conveying apparatus 50 will need to stand by if moving at the reference speed. The conveying apparatus 50 is thus moved at the low speed to shorten the standby time of the conveying apparatus 50, while reducing the power consumption thereof. When no loading requests have been issued by the machining apparatuses 11 and 12 (S64: No), the cell controller 70 also sets the moving speed of the conveying apparatus 50 to the low speed (S67). Also in this case, the moving speed of the conveying apparatus 50 is set to the low speed to shorten the standby time of the conveying apparatus 50, while reducing the power consumption thereof.

Subsequently, the cell controller 70 outputs a command to move the conveying apparatus 50 from the pallet storage 30 to the machining apparatuses 11 and 12 (S68). Upon receiving the movement command, the conveying apparatus 50 moves from the pallet storage 30 to the machining apparatuses 11 and 12 at the decided speed. Then, the objects are moved from the conveying apparatus 50 to the machining apparatuses 11 and 12. The cell controller 70 ends the processing when the movement of the objects is complete (S69).

Now, processing for conveyance from the machining apparatus to the machining apparatus will be described.

When the workpieces W are mounted onto the conveying apparatus 50 at the first machining apparatus 11 (first mounting position) and a command for conveyance from the first machining apparatus 11 to the second machining apparatus 12 is output (FIG. 2, S14: Yes), the cell controller 70 decides the moving speed from the current position to the first machining apparatus 11 (the moving speed corresponds to the second moving speed in the second state in the present invention) as depicted in FIG. 6A.

Figure 6A:
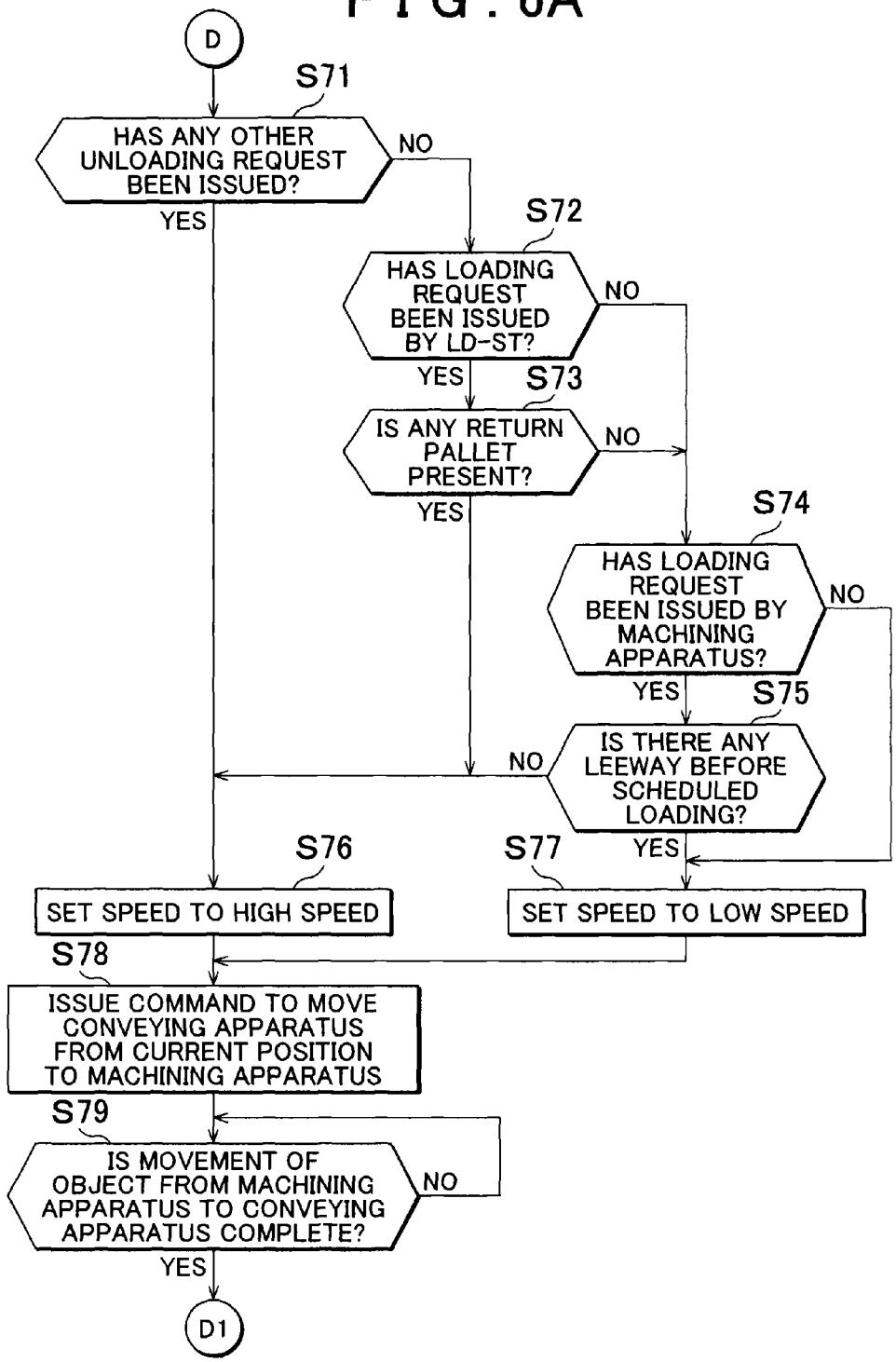
FIG. 6A is a flowchart illustrating processing in D in FIG. 2.

As depicted in FIG. 6A, the cell controller 70 determines whether or not any other unloading request has been issued (S71). When another unloading request has been issued, the cell controller 70 sets the moving speed (corresponding to the above-described second moving speed) to the high speed (S76). The conveying apparatus 50 is in the unmounted state and can thus move at the high speed, while sufficiently suppressing the power consumption thereof. On the other hand, when no other unloading request has been issued (S71: No), loading requests have been issued by the LD-STs 41 and 42 (S72: Yes), and return pallets Pr are present (S73: Yes), the cell controller 70 also sets the moving speed of the conveying apparatus 50 to the high speed (S76).

When no loading requests have been issued by the LD-STs 41 and 42 (S72: No) or no return pallets Pr are present (S73: No), the cell controller 70 determines whether or not loading requests have been issued by the machining apparatuses 11 and 12 (S74). When loading requests have been issued by the machining apparatuses 11 and 12 (S74: Yes), the cell controller 70 determines whether or not there is any leeway before the scheduled loading (S75). Determination of whether or not there is any leeway before the scheduled loading in this case is performed substantially as is the case with the processing for conveyance from the LD-STs 41 and 42 to the machining apparatuses 11 and 12.

Upon determining that there is no leeway before the scheduled loading (S75: No), the cell controller 70 sets the moving speed of the conveying apparatus 50 to the high speed (S76). On the other hand, upon determining that there is a leeway before the scheduled loading (S75: Yes), the cell controller 70 sets the moving speed of the conveying apparatus 50 to the low speed (S77). The conveying apparatus 50 will need to stand by if moving at the reference speed. The conveying apparatus 50 is thus moved at the low speed to shorten the standby time of the conveying apparatus 50, while reducing the power consumption thereof.

When no loading requests have been issued by the machining apparatuses 11 and 12 (S74: No), the cell controller 70 also sets the moving speed of the conveying apparatus 50 to the low speed (S77). Also in this case, the moving speed of the conveying apparatus 50 is set to the low speed to shorten the standby time of the conveying apparatus 50, while reducing the power consumption thereof.

Subsequently, the cell controller 70 outputs a command to move the conveying apparatus 50 from the current position to the first machining apparatus 11 (S78). Upon receiving the movement command, the conveying apparatus 50 moves from the current position to the first machining apparatus 11 at the decided speed. Then, the objects are moved from the first machining apparatus 11 to the conveying apparatus 50. The cell controller 70 continues the processing until the movement of the objects is complete (S79).

Figure 6B:
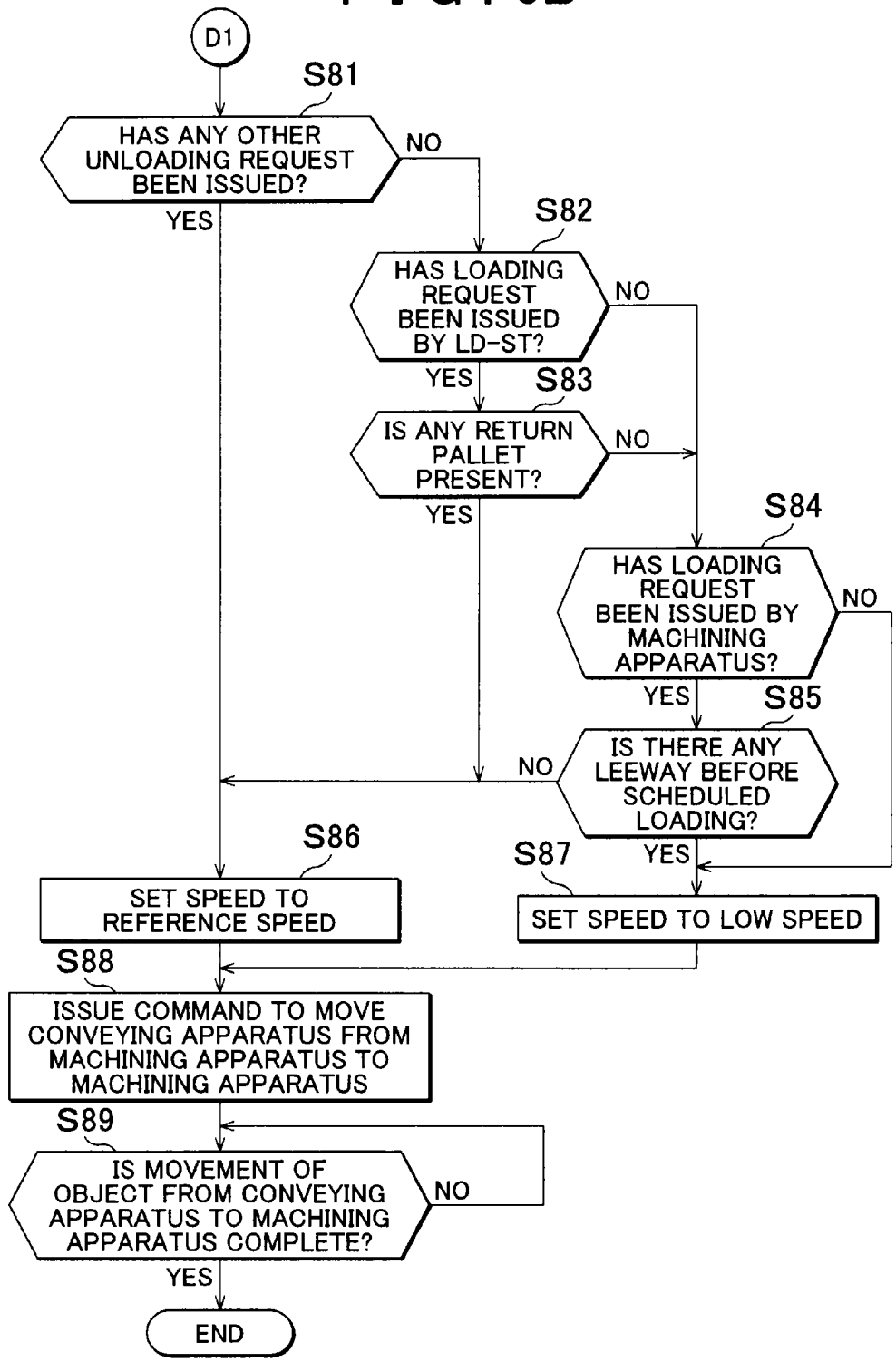
FIG. 6B is a flowchart illustrating processing continued from D1 in FIG. 6A.

Then, as depicted in FIG. 6B, the cell controller 70 decides the moving speed from the first machining apparatus 11 to the second machining apparatus 12 (the moving speed corresponds to the first moving speed in the first state in the present invention). The cell controller 70 determines whether or not any other unloading request has been issued (S81). When another unloading request has been issued, the cell controller 70 sets the moving speed of the conveying apparatus 50 (corresponding to the above-described first moving speed) to the reference speed (S86). Since the objects are mounted on the conveying apparatus 50, the conveying apparatus 50 moves at the reference speed (that is lower than the high speed) instead of moving at the high speed. On the other hand, when no other unloading request has been issued (S81: No), loading requests have been issued by the LD-STs 41 and 42 (S82: Yes), and return pallets Pr are present (S83: Yes), the cell controller 70 also sets the moving speed of the conveying apparatus 50 to the reference speed (S86).

When no loading requests have been issued by the LD-STs 41 and 42 (S82: No) or no return pallets Pr are present (S83: No), the cell controller 70 determines whether or not loading requests have been issued by the machining apparatuses 11 and 12 (S84). When loading requests have been issued by the machining apparatuses 11 and 12 (S84: Yes), the cell controller 70 determines whether or not there is any leeway before the scheduled loading (S85). Determination of whether or not there is any leeway before the scheduled loading in this case is performed substantially as is the case with the processing for conveyance from the LD-STs 41 and 42 to the machining apparatuses 11 and 12.

Upon determining that there is no leeway before the scheduled loading (S85: No), the cell controller 70 sets the moving speed of the conveying apparatus 50 to the reference speed (S86). On the other hand, upon determining that there is a leeway before the scheduled loading (S85: Yes), the cell controller 70 sets the moving speed of the conveying apparatus 50 to the low speed (S87). The conveying apparatus 50 will need to stand by if moving at the reference speed. The conveying apparatus 50 is thus moved at the low speed to shorten the standby time of the conveying apparatus 50, while reducing the power consumption thereof. When no loading requests have been issued by the machining apparatuses 11 and 12 (S84: No), the cell controller 70 also sets the moving speed of the conveying apparatus 50 to the low speed (S87). Also in this case, the moving speed of the conveying apparatus 50 is set to the low speed to shorten the standby time of the conveying apparatus 50, while reducing the power consumption thereof.

Subsequently, the cell controller 70 outputs a command to move the conveying apparatus 50 from the first machining apparatus 11 to the second machining apparatus 12 (S88). Upon receiving the movement command, the conveying apparatus 50 moves from the first machining apparatus 11 to the second machining apparatus 12 at the decided speed. Then, the objects are moved from the conveying apparatus 50 to the second machining apparatus 12. The cell controller 70 ends the processing when the movement of the objects is complete (S89).

Processing of conveyance from the machining apparatuses to the pallet storage will be described below.

Figure 7:
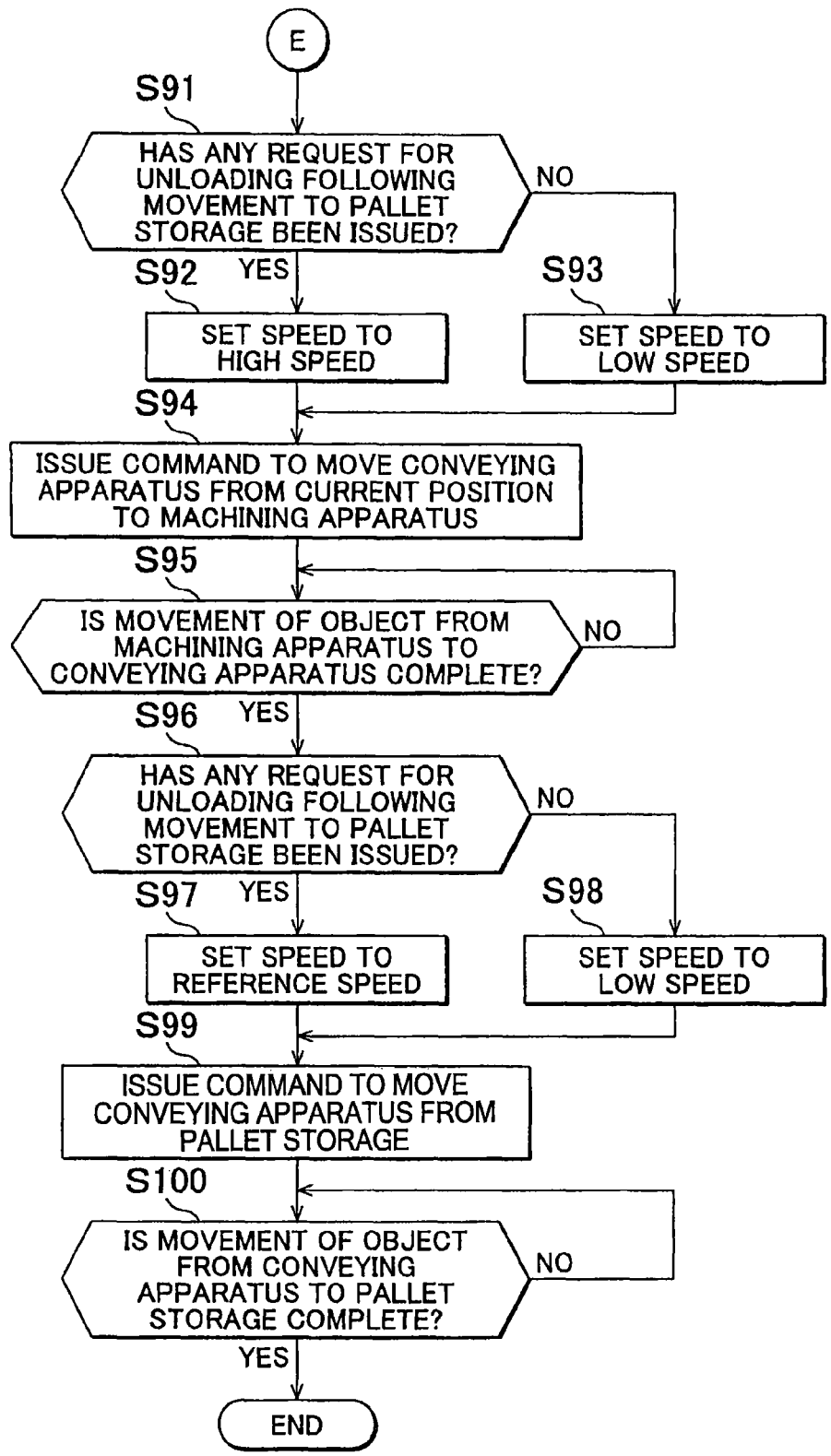
FIG. 7 is a flowchart illustrating processing in E in FIG. 2.

When the workpieces W are mounted onto the conveying apparatus 50 at the machining apparatuses 11 and 12 (second mounting position) and the command for conveyance from the machining apparatuses 11 and 12 to the pallet storage 30 is output (S15 in FIG. 2: Yes), the cell controller 70 decides the moving speed of the conveying apparatus 50 from the current position to the machining apparatuses 11 and 12 (the moving speed corresponds to the fourth moving speed in the fourth state in the present invention) as depicted in FIG. 7. The cell controller 70 determines whether or not a request for unloading following the movement to the pallet storage 30 has been issued (S91). When the following unloading request has been issued, the cell controller 70 sets the moving speed of the conveying apparatus 50 (corresponding to the above-described fourth moving speed) to the high speed (S92). The conveying apparatus 50 is in the unmounted state and can thus move at the high speed, while sufficiently suppressing the power consumption thereof.

On the other hand, when the following unloading request has not been issued, the cell controller 70 sets the moving speed of the conveying apparatus 50 (corresponding to the above-described fourth moving speed) to the low speed (S93). Since the following unloading request has not been issued, the conveying apparatus 50 will need to stand by if moving at the high speed. The conveying apparatus 50 is thus moved at the low speed to shorten the standby time of the conveying apparatus 50, while reducing power consumption thereof.

Subsequently, the cell controller 70 outputs a command to move the conveying apparatus 50 from the current position to the machining apparatuses 11 and 12 (S94). Upon receiving the movement command, the conveying apparatus 50 moves from the current position to the machining apparatuses 11 and 12 at the decided speed. Then, the objects are moved from the machining apparatuses 11 and 12 to the conveying apparatus 50. The cell controller 70 continues the processing until the movement of the objects is complete (S95).

When the movement of the objects is complete (S95: Yes), the cell controller 70 decides the moving speed from the machining apparatuses 11 and 12 to the pallet storage 30 (the moving speed corresponds to the third moving speed in the third state in the present invention). The cell controller 70 determines whether or not a request for unloading following the movement to the pallet storage 30 has been issued (S96). When the following unloading request has been issued, the cell controller 70 sets the moving speed of the conveying apparatus 50 (corresponding to the above-described third moving speed) to the reference speed (S97). Since the objects are mounted on the conveying apparatus 50, the conveying apparatus 50 moves at the reference speed (that is lower than the high speed) instead of moving at the high speed.

On the other hand, when the following unloading request has not been issued, the cell controller 70 sets the moving speed of the conveying apparatus 50 (corresponding to the above-described third moving speed) to the low speed (S98). Since the following unloading request has not been issued, the conveying apparatus 50 will need to stand by if moving at the reference speed. The conveying apparatus 50 is thus moved at the low speed to shorten the standby time of the conveying apparatus 50, while reducing the power consumption thereof.

Subsequently, the cell controller 70 outputs a command to move the conveying apparatus 50 from the machining apparatuses 11 and 12 to the pallet storage 30 (S99). Upon receiving the movement command, the conveying apparatus 50 moves from the machining apparatuses 11 and 12 to the pallet storage 30 at the decided speed. Then, the objects are moved from the conveying apparatus 50 to the pallet storage 30. Upon completing the movement of the objects, the cell controller 70 ends the processing (S100).

Now, processing for conveyance from the machining apparatuses to the LD-STs will be described.

When a command for conveyance from the machining apparatuses 11 and 12 to the LD-STs 41 and 42 is output (S16 in FIG. 2: Yes), the cell controller 70 decides the moving speed as follows. The output of the command for conveyance to the LD-STs 41 and 42 (loading command) means that the operators are at the LD-STs 41 and 42. In other words, the standby time of the operators is desirably minimized.

Figure 8:
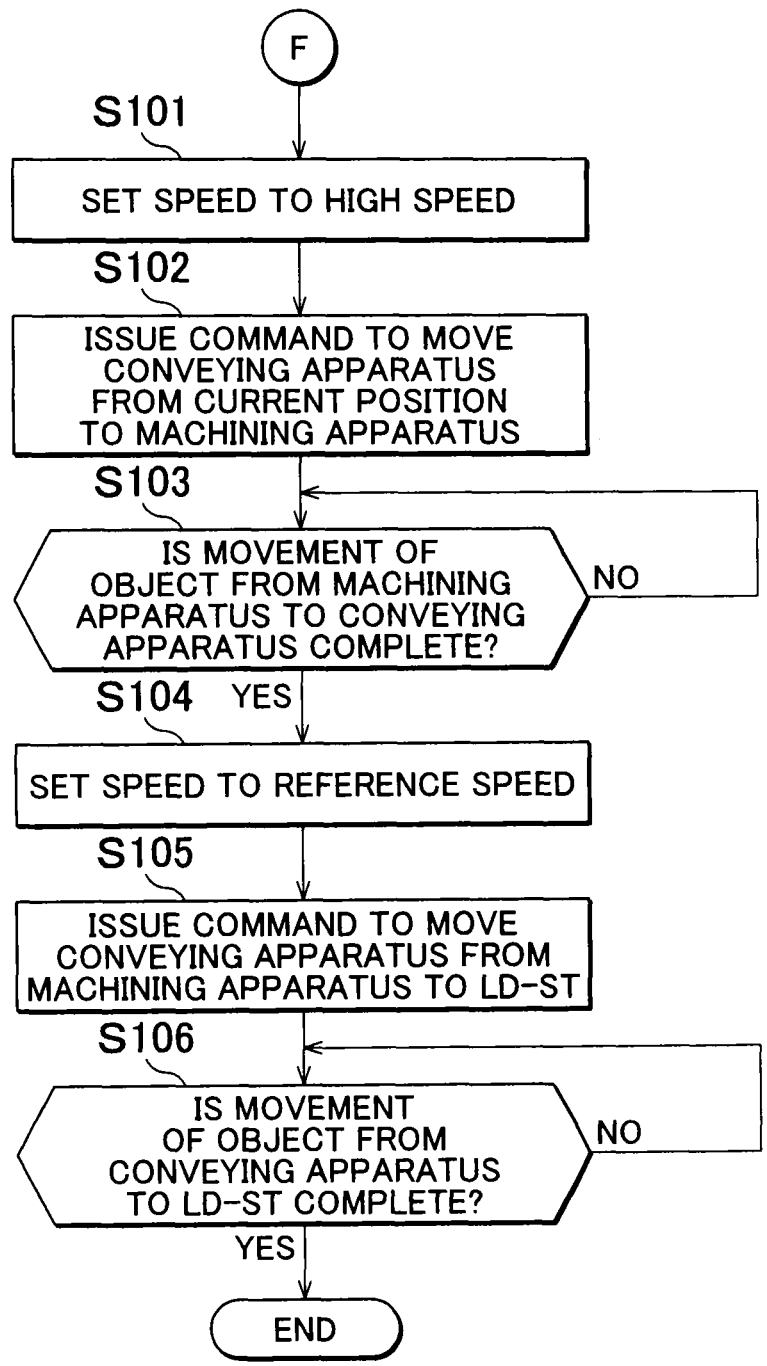
FIG. 8 is a flowchart illustrating processing in F in FIG. 2.

As depicted in FIG. 8, the cell controller 70 sets the moving speed of the conveying apparatus 50 from the current position to the machining apparatuses 11 and 12, to the high speed (S101). The conveying apparatus 50 is in the unmounted state and can thus move at the high speed, while sufficiently suppressing the power consumption thereof. Subsequently, the cell controller 70 outputs a command to move the conveying apparatus 50 from the current position to the machining apparatuses 11 and 12 (S102). Upon receiving the movement command, the conveying apparatus 50 moves from the current position to the machining apparatuses 11 and 12 at the high speed. Then, the objects are moved from the machining apparatuses 11 and 12 to the conveying apparatus 50. The cell controller 70 continues the processing until the movement of the objects is complete (S103).

When the movement of the objects is complete (S103: Yes), the cell controller 70 sets the moving speed of the conveying apparatus 50 from the machining apparatuses 11 and 12 to the conveying apparatus 50 to the reference speed (S104). Since the objects are mounted on the conveying apparatus 50, the conveying apparatus 50 moves at the reference speed (that is lower than the high speed) instead of moving at the high speed. Subsequently, the cell controller 70 outputs a command to move the conveying apparatus 50 from the machining apparatuses 11 and 12 to the LD-STs 41 and 42 (S105). Upon receiving the movement command, the conveying apparatus 50 moves from the machining apparatuses 11 and 12 to the LD-STs 41 and 42 at the reference speed. Then, the objects are moved from the conveying apparatus 50 to the LD-STs 41 and 42. Upon completing the movement of the objects, the cell controller 70 ends the processing (S106).

Now, processing for conveyance from the pallet storage to the LD-STs will be described. When a command for conveyance from the pallet storage 30 to the LD-STs 41 and 42 is output (S17 in FIG. 2: Yes), the cell controller 70 decides the moving speed as follows. Also in this case, the output of the command for conveyance to the LD-STs 41 and 42 (loading command) means that the operators are at the LD-STs 41 and 42. In other words, the standby time of the operators is desirably minimized.

Figure 9:
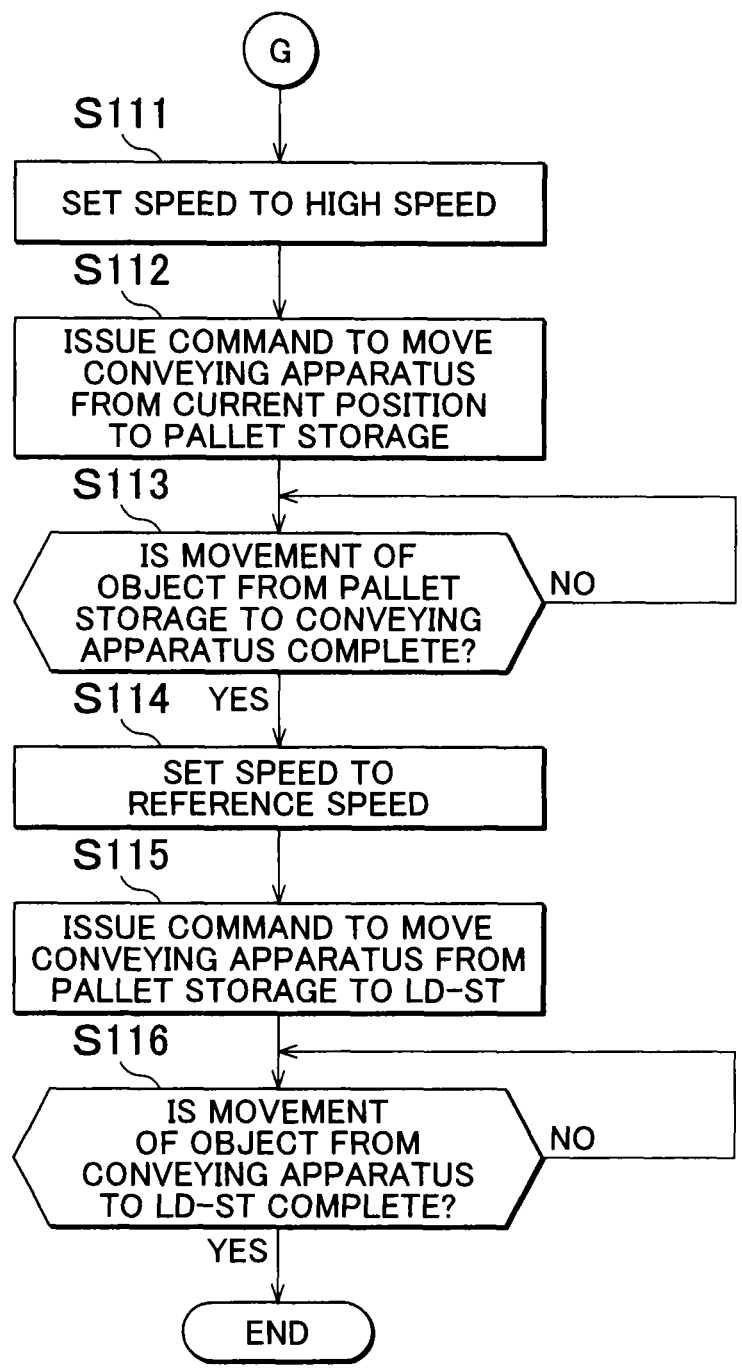
FIG. 9 is a flowchart illustrating processing in G in FIG. 2.

As depicted in FIG. 9, the cell controller 70 sets the moving speed of the conveying apparatus 50 from the current position to the machining apparatuses 11 and 12 to the high speed (S111). The conveying apparatus 50 is in the unmounted state and can thus move at the high speed, while sufficiently suppressing the power consumption thereof. Subsequently, the cell controller 70 outputs a command to move the conveying apparatus 50 from the current position to the pallet storage 30 (S112). Upon receiving the movement command, the conveying apparatus 50 moves from the current position to the pallet storage 30 at the high speed. Then, the objects are moved from the pallet storage 30 to the conveying apparatus 50. The cell controller 70 continues the processing until the movement of the objects is complete (S113).

When the movement of the objects is complete (S113: Yes), the cell controller 70 sets the moving speed of the conveying apparatus 50 from the pallet storage 30 to the LD-STs 41 and 42 to the reference speed (S114). Since the objects are mounted on the conveying apparatus 50, the conveying apparatus 50 moves at the reference speed (that is lower than the high speed) instead of moving at the high speed. Subsequently, the cell controller 70 outputs a command to move the conveying apparatus 50 from the pallet storage 30 to the LD-STs 41 and 42 (S116). Upon receiving the movement command, the conveying apparatus 50 moves from the pallet storage 30 to the LD-STs 41 and 42 at the reference speed. Then, the objects are moved from the conveying apparatus 50 to the LD-STs 41 and 42. Upon completing the movement of the objects, the cell controller 70 ends the processing (S116).

As described above, the moving speed of the conveying apparatus 50 is set to the reference speed, the high speed, or the low speed according to the situation. With the objects conveyed in accordance with the schedule management, the moving speed of the conveying apparatus 50 is set to the low speed according to the situation, thus reducing the power consumption of the conveying apparatus 50. Moreover, setting the moving speed of the conveying apparatus 50 to the low speed extends the life of the conveying apparatus 50. When the conveying apparatus 50 moves in the unmounted state and there is a leeway before the scheduled loading, the conveying apparatus 50 is moved at the high speed, with the power consumption thereof sufficiently suppressed. Therefore, the standby time of the machining apparatuses 11 and 12 or the like to which the objects are to be conveyed is reliably shortened.

In the embodiment, the FMS has been described as an example of a conveyance system. However, the present invention is applicable to, in addition to the embodiment, a conveyance system for a production line including a machining apparatus and a conveying apparatus that conveys workpieces. In other words, when the workpieces are moved to a loading position, the machining apparatus, and an unloading position in this order, the speed of the conveying apparatus can be changed to the high speed, the reference speed, and the low speed in this order as described above.

What is claimed is:

1. A conveyance system comprising:
    a conveying apparatus that conveys a machining object to a machining apparatus; and
    a controller that controls the conveying apparatus, wherein
    a first state is defined as a state where, if a next destination to which the object is to be conveyed by the conveying apparatus is the machining apparatus and when the object is mounted onto the conveying apparatus at a first mounting position that the conveying apparatus leaves after the object is mounted onto the conveying apparatus, the conveying apparatus with the object mounted thereon conveys the object from the first mounting position to the machining apparatus,
    the controller includes:
        estimated time calculation circuitry that calculates a first conveyance completion estimated time when conveyance from the first mounting position to the machining apparatus at a preset reference speed is complete; and
        moving speed decision circuitry that, if the machining apparatus issues a request to load a next object into the machining apparatus, decides a first moving speed of the conveying apparatus in the first state to be the reference speed when the machining apparatus is not performing a machining operation at the first conveyance completion estimated time and to be a low speed lower than the reference speed when the machining apparatus is performing the machining operation at the first conveyance completion estimated time, and
    the conveying apparatus moves from the first mounting position to the machining apparatus at the first moving speed.

2. The conveyance system according to claim 1, wherein the moving speed decision circuitry decides the first moving speed to be the low speed when no request to load the next object into the machining apparatus is issued by the machining apparatus.

3. The conveyance system according to claim 2, further comprising:
    a palette storage in which a plurality of pallets is stored, wherein
    the object is mounted on the pallet,
    a third state is defined as a state where, if the next destination to which the object is to be conveyed by the conveying apparatus is a pallet storage and when the object is mounted onto the conveying apparatus at a second mounting position that the conveying apparatus leaves after the object is loaded on the conveying apparatus, the conveying apparatus with the object mounted thereon conveys the object from the second mounting position to the pallet storage,
    the moving speed decision circuitry decides a third moving speed of the conveying apparatus in the third state to be the reference speed when a next conveyance command is issued from the pallet storage and to be the low speed when the next conveyance command is not issued from the pallet storage, and
    the conveying apparatus moves from the second mounting position to the pallet storage at the third moving speed.

4. The conveyance system according to claim 2, wherein
a second state is defined as a state where the conveying apparatus with no object mounted thereon is moved from a current position of the conveying apparatus to the first mounting position,
the estimated time calculation circuitry calculates a second conveyance completion estimated time when conveyance from the current position to the machining apparatus via the first mounting position at the reference speed is complete, and
when a request to load the next object into the machining apparatus is issued by the machining apparatus, the moving speed decision circuitry decides a second moving speed of the conveying apparatus in the second state to be a speed higher than the reference speed when the machining apparatus is not performing the machining operation at the second conveyance completion estimated time and to be the low speed when the machining apparatus is performing the machining operation at the second conveyance completion estimated time, and
the conveying apparatus moves from the current position to the first mounting position at the second moving speed.

5. The conveyance system according to claim 4, wherein
the moving speed decision circuitry decides the second moving speed to be the low speed when no request to load the next object into the machining apparatus is issued by the machining apparatus.

6. The conveyance system according to claim 4, further comprising:
a palette storage in which a plurality of pallets is stored, wherein
the object is mounted on the pallet,
a third state is defined as a state where, if the next destination to which the object is to be conveyed by the conveying apparatus is a pallet storage and when the object is mounted onto the conveying apparatus at a second mounting position that the conveying apparatus leaves after the object is loaded on the conveying apparatus, the conveying apparatus with the object mounted thereon conveys the object from the second mounting position to the pallet storage,
the moving speed decision circuitry decides a third moving speed of the conveying apparatus in the third state to be the reference speed when a next conveyance command is issued from the pallet storage and to be the low speed when the next conveyance command is not issued from the pallet storage, and
the conveying apparatus moves from the second mounting position to the pallet storage at the third moving speed.

7. The conveyance system according to claim 1, wherein
a second state is defined as a state where the conveying apparatus with no object mounted thereon is moved from a current position of the conveying apparatus to the first mounting position,
the estimated time calculation circuitry calculates a second conveyance completion estimated time when conveyance from the current position to the machining apparatus via the first mounting position at the reference speed is complete, and
when a request to load the next object into the machining apparatus is issued by the machining apparatus, the moving speed decision circuitry decides a second moving speed of the conveying apparatus in the second state to be a speed higher than the reference speed when the machining apparatus is not performing the machining operation at the second conveyance completion estimated time and to be the low speed when the machining apparatus is performing the machining operation at the second conveyance completion estimated time, and
the conveying apparatus moves from the current position to the first mounting position at the second moving speed.

8. The conveyance system according to claim 7, further comprising:
a palette storage in which a plurality of pallets is stored, wherein
the object is mounted on the pallet,
a third state is defined as a state where, if the next destination to which the object is to be conveyed by the conveying apparatus is a pallet storage and when the object is mounted onto the conveying apparatus at a second mounting position that the conveying apparatus leaves after the object is loaded on the conveying apparatus, the conveying apparatus with the object mounted thereon conveys the object from the second mounting position to the pallet storage,
the moving speed decision circuitry decides a third moving speed of the conveying apparatus in the third state to be the reference speed when a next conveyance command is issued from the pallet storage and to be the low speed when the next conveyance command is not issued from the pallet storage, and
the conveying apparatus moves from the second mounting position to the pallet storage at the third moving speed.

9. The conveyance system according to claim 7, wherein
the moving speed decision circuitry decides the second moving speed to be the low speed when no request to load the next object into the machining apparatus is issued by the machining apparatus.

10. The conveyance system according to claim 9, further comprising:
a palette storage in which a plurality of pallets is stored, wherein
the object is mounted on the pallet,
a third state is defined as a state where, if the next destination to which the object is to be conveyed by the conveying apparatus is a pallet storage and when the object is mounted onto the conveying apparatus at a second mounting position that the conveying apparatus leaves after the object is loaded on the conveying apparatus, the conveying apparatus with the object mounted thereon conveys the object from the second mounting position to the pallet storage,
the moving speed decision circuitry decides a third moving speed of the conveying apparatus in the third state to be the reference speed when a next conveyance command is issued from the pallet storage and to be the low speed when the next conveyance command is not issued from the pallet storage, and
the conveying apparatus moves from the second mounting position to the pallet storage at the third moving speed.

11. The conveyance system according to claim 1, further comprising:
a palette storage in which a plurality of pallets is stored, wherein
the object is mounted on the pallet,
a third state is defined as a state where, if the next destination to which the object is to be conveyed by the conveying apparatus is a pallet storage and when the object is mounted onto the conveying apparatus at a second mounting position that the conveying apparatus leaves after the object is loaded on the conveying apparatus, the conveying apparatus with the object mounted thereon conveys the object from the second mounting position to the pallet storage, the moving speed decision circuitry decides a third moving speed of the conveying apparatus in the third state to be the reference speed when a next conveyance command is issued from the pallet storage and to be the low speed when the next conveyance command is not issued from the pallet storage, and the conveying apparatus moves from the second mounting position to the pallet storage at the third moving speed.

12. The conveyance system according to claim 11, wherein the second mounting position is the machining apparatus or a pallet changer that conveys the object between the machining apparatus and the conveying apparatus, or the loading station.

13. The conveyance system according to claim 11, wherein a fourth state is defined as a state where the conveying apparatus with no object mounted thereon is moved from the current position of the conveying apparatus to the second mounting position, the moving speed decision circuitry decides a fourth moving speed of the conveying apparatus in the fourth state to be a speed higher than the reference speed when a next conveyance command is issued from the pallet storage and to be the low speed when the next conveyance command is not issued from the pallet storage, and the conveying apparatus moves from the current position to the second mounting position at the fourth moving speed.

14. The conveyance system according to claim 11, wherein the first mounting position is the pallet storage or a loading station where an operator loads and unloads the object onto and from the conveyance system.

* * * * *